(12) United States Patent
Steiner et al.

(10) Patent No.: US 7,942,570 B2
(45) Date of Patent: May 17, 2011

(54) BLENDER FOR BLENDING FOODSTUFF

(75) Inventors: Mark C. Steiner, Midlothian, VA (US);
Adam Hanes, Glen Allen, VA (US);
Ernest B. Pryor, Jr., Glen Allen, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 1057 days.

(21) Appl. No.: 11/555,050

(22) Filed: Oct. 31, 2006

(65) Prior Publication Data

US 2008/0098905 A1    May 1, 2008

(51) Int. Cl.
*B01F 7/00* (2006.01)
(52) U.S. Cl. ...................................... 366/197
(58) Field of Classification Search ............... 366/197
See application file for complete search history.

(56) References Cited

U.S. PATENT DOCUMENTS

| | | |
|---|---|---|
| 1,100,648 A | 6/1914 | Bennett |
| 1,650,256 A | 11/1927 | Beach |
| 2,284,155 A | 5/1942 | Landgraf |
| 2,761,659 A | 9/1956 | Collura |
| 2,940,738 A | 6/1960 | Posener et al. |
| 3,139,917 A | 7/1964 | Elmore |
| 3,299,226 A | 1/1967 | Edwards |
| D213,938 S | 4/1969 | Morris |
| 3,493,215 A | 2/1970 | Edwards et al. |
| 3,596,161 A | 7/1971 | Swanke et al. |
| 3,610,762 A | 10/1971 | Dugan |
| 3,612,125 A | 10/1971 | Krauth |
| 3,612,969 A | 10/1971 | Cockroft |
| 3,805,096 A | 4/1974 | Hamilton, II |
| 3,901,484 A | 8/1975 | Ernster |
| 3,908,100 A | 9/1975 | Richard et al. |
| 3,943,421 A | 3/1976 | Shibata et al. |
| D242,208 S | 11/1976 | Madl et al. |
| 4,121,204 A | 10/1978 | Welch et al. |
| 4,270,171 A | 5/1981 | Maples et al. |

(Continued)

OTHER PUBLICATIONS

Office Action Issued Aug. 2, 2010 in China Appln. No. 200710165690.6.

*Primary Examiner* — Walter D Griffin
*Assistant Examiner* — Christopher K VanDeusen
(74) *Attorney, Agent, or Firm* — Panitch Schwarze Belisario & Nadel LLP

(57) ABSTRACT

A blender for blending foodstuff comprising a motor housing that encloses an electric motor and has a first end and a second end. An upper housing is attached to the first end of the motor housing. The motor housing includes a fan driven by the motor controlled by a plurality of switches positioned behind a flexible cover. A transparent base having translucent base feet and an open bottom partially surrounds the motor housing and has a first end. The first end of the base is clamped between the upper housing and the first end of the motor housing to thereby solely suspend the motor housing from the first end of the base. A shroud is positioned partially around the motor within the motor housing. The fan draws air through the open bottom of the base into the second end of the motor housing and then around and outside of the shroud into the open top of the shroud to thereby cool the motor. The air is then directed out through the open side portion of the shroud and then sealingly vented to atmosphere.

13 Claims, 8 Drawing Sheets

U.S. PATENT DOCUMENTS

| | | |
|---|---|---|
| 4,828,532 A | 5/1989 | Tarlow et al. |
| 4,893,942 A | 1/1990 | Stottmann |
| 5,273,358 A | 12/1993 | Byrne et al. |
| 5,347,205 A | 9/1994 | Piland |
| 5,653,536 A | 8/1997 | Mandel |
| D386,941 S | 12/1997 | Barker |
| D394,986 S | 6/1998 | Lallemand |
| D400,048 S | 10/1998 | Ollson |
| D400,757 S | 11/1998 | Hippen et al. |
| 5,845,991 A | 12/1998 | Sundquist |
| 5,880,718 A | 3/1999 | Frindle et al. |
| 5,905,485 A | 5/1999 | Podoloff |
| D415,384 S | 10/1999 | Littmann |
| 5,977,956 A | 11/1999 | Gerrard |
| D417,581 S | 12/1999 | Barthelemy et al. |
| D421,362 S | 3/2000 | Arcidiacono et al. |
| 6,059,445 A | 5/2000 | St John et al. |
| 6,069,423 A | 5/2000 | Miller et al. |
| 6,193,407 B1 | 2/2001 | Kubicz |
| 6,219,038 B1 | 4/2001 | Cho |
| D444,344 S | 7/2001 | Barthelemy et al. |
| D448,967 S | 10/2001 | Planca et al. |
| 6,364,226 B1 | 4/2002 | Kubicko |
| 6,364,522 B2 | 4/2002 | Kolar et al. |
| 6,397,735 B1 | 6/2002 | Wong |
| 6,402,365 B1 | 6/2002 | Wong |
| 6,414,671 B1 | 7/2002 | Gillespie et al. |
| 6,435,708 B1 * | 8/2002 | Huang ............... 366/347 |
| D466,362 S | 12/2002 | Moore |
| 6,499,873 B1 | 12/2002 | Chen |
| D472,245 S | 3/2003 | Andre et al. |
| 6,534,970 B1 | 3/2003 | Ely et al. |
| D473,100 S | 4/2003 | Sakai et al. |
| D473,749 S | 4/2003 | Pascotti |
| 6,595,113 B1 | 7/2003 | Chang |
| 6,599,006 B1 | 7/2003 | Lin |
| 6,609,821 B2 | 8/2003 | Wulf et al. |
| 6,610,936 B2 | 8/2003 | Gillespie et al. |
| D479,666 S | 9/2003 | Barker |
| 6,632,013 B2 | 10/2003 | Wulf et al. |
| D484,357 S | 12/2003 | Seum et al. |
| D489,051 S | 4/2004 | Shiraki et al. |
| D491,416 S | 6/2004 | Pascotti |
| 6,758,592 B2 | 7/2004 | Wulf et al. |
| 6,809,275 B1 | 10/2004 | Cheng et al. |
| D499,602 S | 12/2004 | Feil |
| 6,839,052 B1 | 1/2005 | Kramer |
| D502,358 S | 3/2005 | Weaden |
| 6,867,764 B2 | 3/2005 | Ludtke |
| D510,238 S | 10/2005 | Yen |
| 6,966,690 B2 | 11/2005 | Yen |
| D512,265 S | 12/2005 | McCurrach |
| 6,979,096 B2 | 12/2005 | Ortega |
| 6,992,658 B2 | 1/2006 | Wu et al. |
| 2003/0095096 A1 | 5/2003 | Robbin et al. |
| 2003/0179645 A1 | 9/2003 | Seul |
| 2004/0179350 A1 | 9/2004 | Ortega |
| 2004/0252109 A1 | 12/2004 | Trent, Jr. et al. |
| 2005/0068846 A1 | 3/2005 | Wulf et al. |
| 2005/0152215 A1 | 7/2005 | Stuart et al. |
| 2005/0190644 A1 | 9/2005 | Yen |
| 2005/0259085 A1 | 11/2005 | Baker et al. |
| 2006/0007778 A1 | 1/2006 | Tai |
| 2006/0038793 A1 | 2/2006 | Philipp |
| 2006/0043088 A1 | 3/2006 | Ancona et al. |

* cited by examiner

— 1 —
BLENDER FOR BLENDING FOODSTUFF

BACKGROUND OF THE INVENTION

The present application is directed to a blender for blending foodstuff and, more particularly, to a blender that includes a transparent base and a suspended motor housing.

Blenders are a common household appliance and are capable of mixing liquids and chopping dry foods. Blenders are also useful for liquefying fruits and vegetables and for blending solids with liquids. A typical blender includes a container comprised of a collar and a jar that sits on top of an opaque polymeric base that encloses a motor. The collar includes a blending tool rotatably mounted thereto. The blending tool is rotatably engageable with a drive shaft of the motor in an operating configuration. Foodstuff is placed into the container and the container is engaged with the base. The foodstuff is blended and the container is removed from the base to dispense or pour the blended foodstuff.

Because blenders are frequently used and left out on a household countertop, the overall appearance of the blender is important. It would be desirable to have a base formed from a transparent or translucent outer housing with an open bottom showing a second housing, encasing the motor, and a light to illuminate the countertop and the components within the base. Further, it would be desirable to support the motor housing from an upper portion of the base to give the appearance that the motor housing is suspended within the transparent outer housing. It would also be desirable to have recessed controls on the outer housing for ease of use and a corresponding modern appearance.

Rubber tabs or strips called feet are often attached to the bottom of the blender housing to keep the blender from sliding during use. Traditional feet are comprised of an opaque rubber and the size and location of the feet is often immaterial because the opaque base conceals the use of base feet. In a blender with a transparent and open bottom however, it would be desirable to easily and conspicuously integrate the base feet in the bottom edge of the base.

Because appliances such as blenders have motors running at very high speeds, they must be vented to keep cool while in operation. Traditional blenders draw air into the housing, circulate the air to cool the motor, and then exhaust or vent the air out of the housing. Dust, specifically brush dust from the motor, is deposited within the housing as the air circulates. Traditionally, this is not a concern because the opaque outer housing conceals the deposited dust. However, a blender having a transparent base would easily show this dust and detract from the blender's appearance, requiring additional cleaning. It would be desirable therefore, to draw in, and sealingly circulate and exhaust the cooling air minimizing the air traveling over the inner surface of the base.

BRIEF SUMMARY OF THE INVENTION

Briefly stated, the present invention is directed to a blender for blending foodstuff. The blender is for being positioned on a support surface. The blender comprises a motor housing that encloses an electric motor and has a first end, a second end, and first distance between the first and second ends. An upper housing is attached to the first end of the motor housing. A base partially surrounds the motor housing and has a first end, a second end and a second distance between the first and second ends of the base. The second end of the base engages the support surface during use. The first end of the base is clamped between the upper housing and the first end of the motor housing. The first distance is less than the second distance such that the second end of the motor housing is spaced from the support surface during use to thereby solely suspend the motor housing from the first end of the base.

In another aspect, the present invention is directed to a blender for blending foodstuff. The blender is for being positioned on a support surface. The blender comprises a motor housing enclosing an electric motor. A base at least partially surrounds the motor housing and is constructed of a transparent material. The base engages the support surface during use. A jar is releasably positioned on the base and has a rotatable blending tool therein that is operatively engaged with the electric motor for being driven by the electric motor when the jar is positioned on the base.

In another aspect, the present invention is directed to a blender for blending foodstuff. The blender is for being positioned on a support surface. The blender comprises a motor housing enclosing an electric motor. The motor housing has a first end and a second end. The motor housing includes a fan driven by the motor. The fan is positioned proximate the second end of the motor housing. The second end of the motor housing includes intake vent openings. A shroud is positioned partially around the motor within the motor housing and is positioned between the fan and the second end of the motor housing. The shroud has an open top that faces towards the first end of the motor housing and an open side portion. A base has a side wall partially surrounding and spaced from the motor housing. The base has an open bottom. The side wall of the base has an outtake vent in fluid communication with the open side portion of the shroud. A jar releasably positioned on the base includes a rotatable blending tool therein operatively engaged with the electric motor for being driven by the electric motor when the jar is positioned on the base. The fan draws air through the open bottom of the base into the motor housing through the intake vent openings and then around an outside of the shroud into the open top of the shroud to thereby cool motor and out through the open side portion of the shroud and then through the outtake vent to atmosphere.

In another aspect, the invention is directed to a blender for blending foodstuff. The blender is for being positioned on a support surface. The blender includes a transparent wall for surrounding a electric motor. The housing has an open bottom with an exposed bottom edge. The bottom edge includes an opening formed therein. The blender also includes a plurality of base feet constructed of a translucent elastomeric material. The base feet are in the form of a strip having a thickness less than a thickness of the wall of the base. The base feet have a first end and a second end. The first end is at least partially positioned within the opening in the bottom edge. The second end extends outwardly from the bottom edge for engaging the support surface.

In another aspect, the invention is directed to a blender for blending foodstuff. The blender is for being positioned on a support surface. The blender comprises a base that encloses an electric motor. A jar is releasably positioned on the base and has a rotatable blending tool therein operatively engaged with the electric motor for being driven by the electric motor when the jar is positioned on the base. A control switch controls the electric motor. The control switch is positioned on the base and has a plurality of switches disposed beneath a flexible cover. Corresponding indicia are printed on the cover. The switches control the electric motor to operate the blender.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
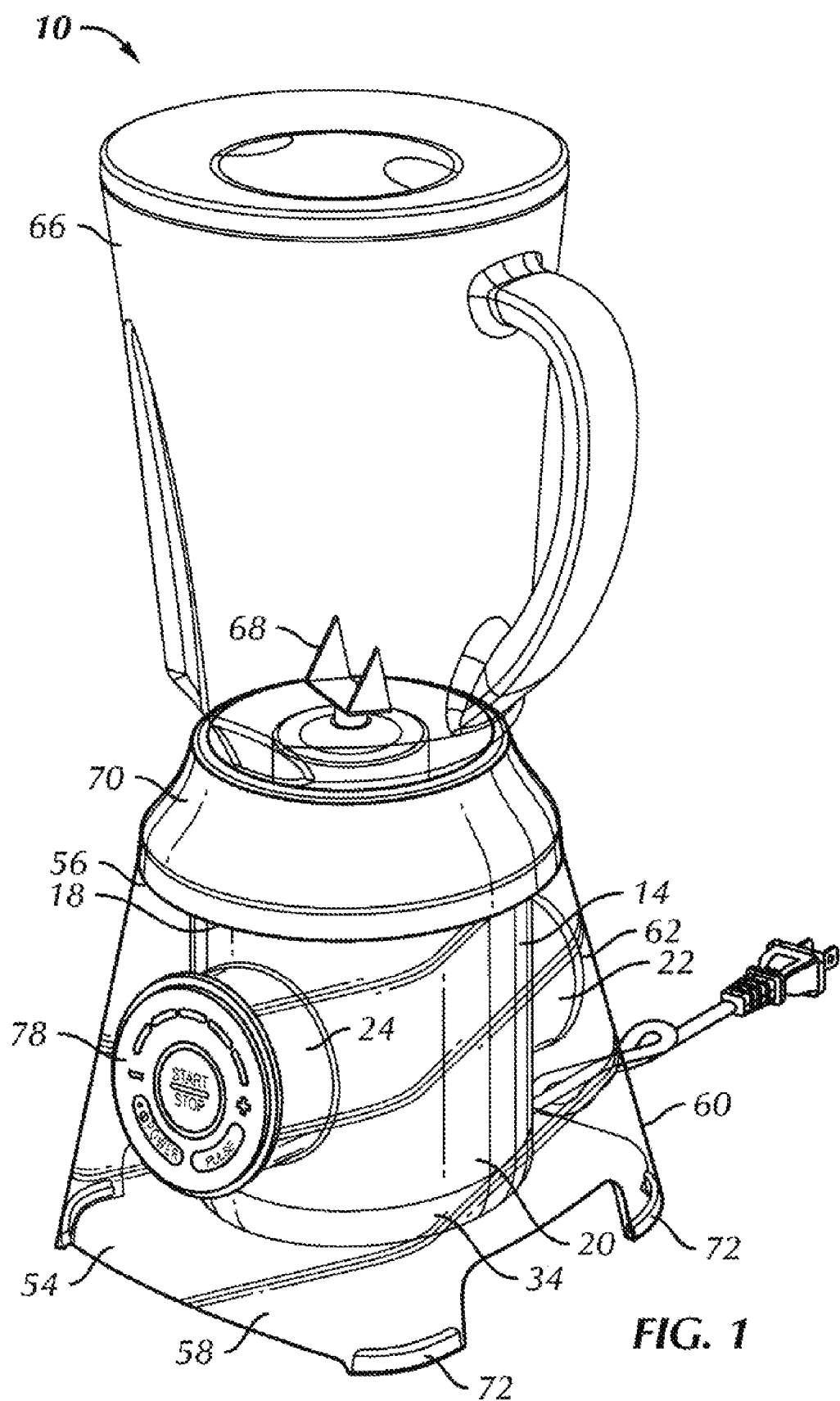
FIG. 1 is a front perspective view of a blender in accordance with the present invention.
Figure 2:
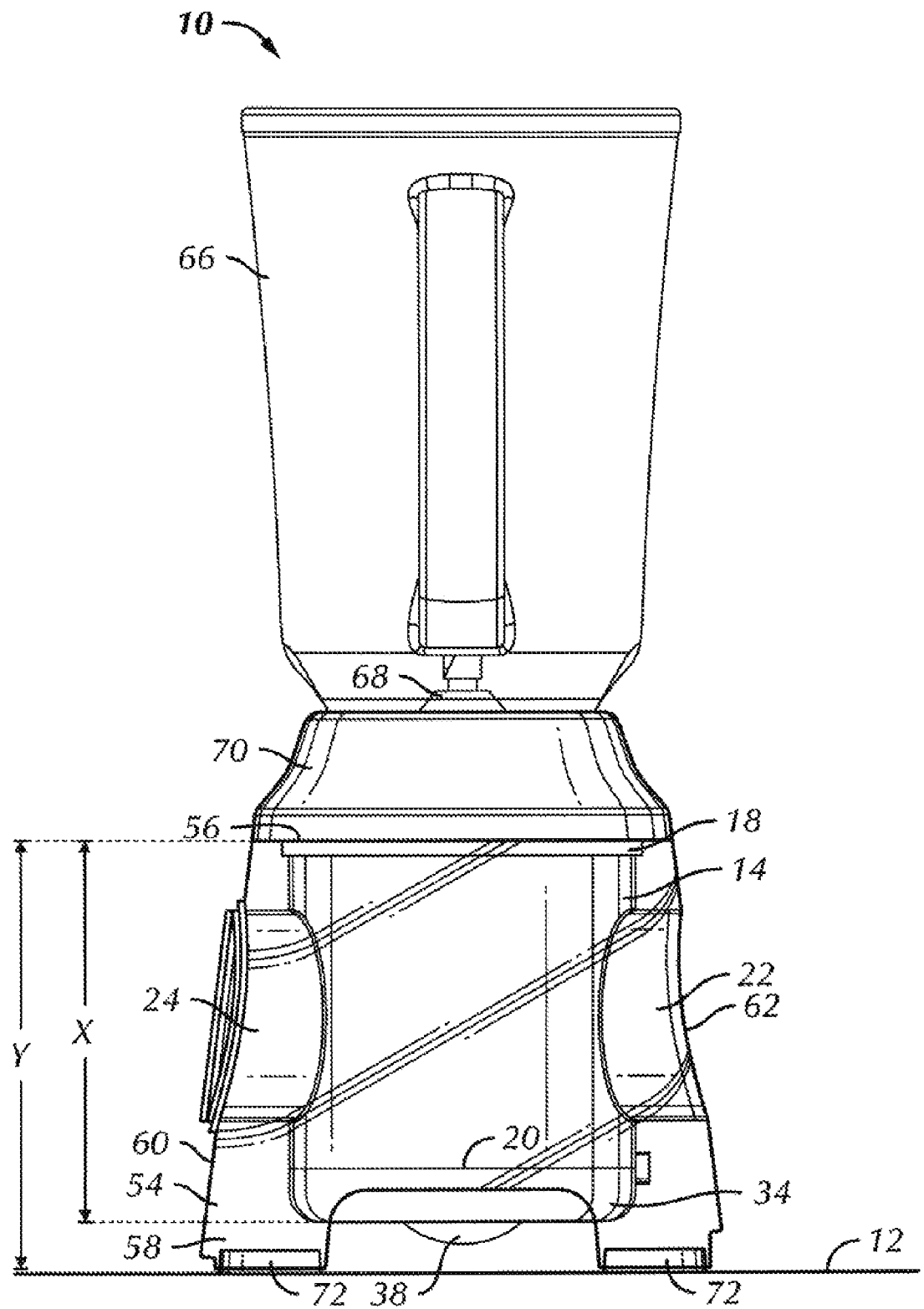
FIG. 2 is a left side elevational view of the blender shown in FIG. 1.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of a blender in accordance with the present invention, and designated parts thereof. The terminology includes the words noted above, derivatives thereof and words of similar import.

Referring to the drawings, wherein like numerals indicate like elements throughout, there is shown in FIGS. 1-9 a blender, generally designated 10. The blender 10 is for being positioned on a support surface 12. The support surface 12 is any type of flat surface which a user desires to position the blender 10 for blending foodstuff. Typical support surfaces include kitchen countertops, kitchen tables, bars, etc.

Referring now to FIGS. 1, 5, 6 and 7, the blender 10 includes a motor housing 14 enclosing an electric motor 16. The electric motor 16 is a standard electric motor used in small appliances well understood by those of ordinary skill in the art. Accordingly, further description of the motor 16 is omitted for purposes of convenience only and is not limiting. The motor housing 14 has a first end 18, a second end 20 and a first distance X between the first and second ends 18, 20. The motor housing 14 is generally cylindrically shaped and is preferably constructed of a high strength, lightweight material, such as thermoplastic acrylonitrile butadiene styrene (ABS) or other polymeric material. The ABS material may also include chrome-platable ABS. The motor housing 14 includes first and second side extensions 22, 24, respectively extending from the cylindrical motor housing 14. The first and second side extensions 22, 24 are positioned on opposing sides of the motor housing 14. The first and second side extensions 22, 24 are also generally cylindrical but are oriented normal to the motor housing 14. The first side extension 22 provides an open fluid passageway from the motor housing 14 to the distal end of the first side extension 22.

Figure 4:
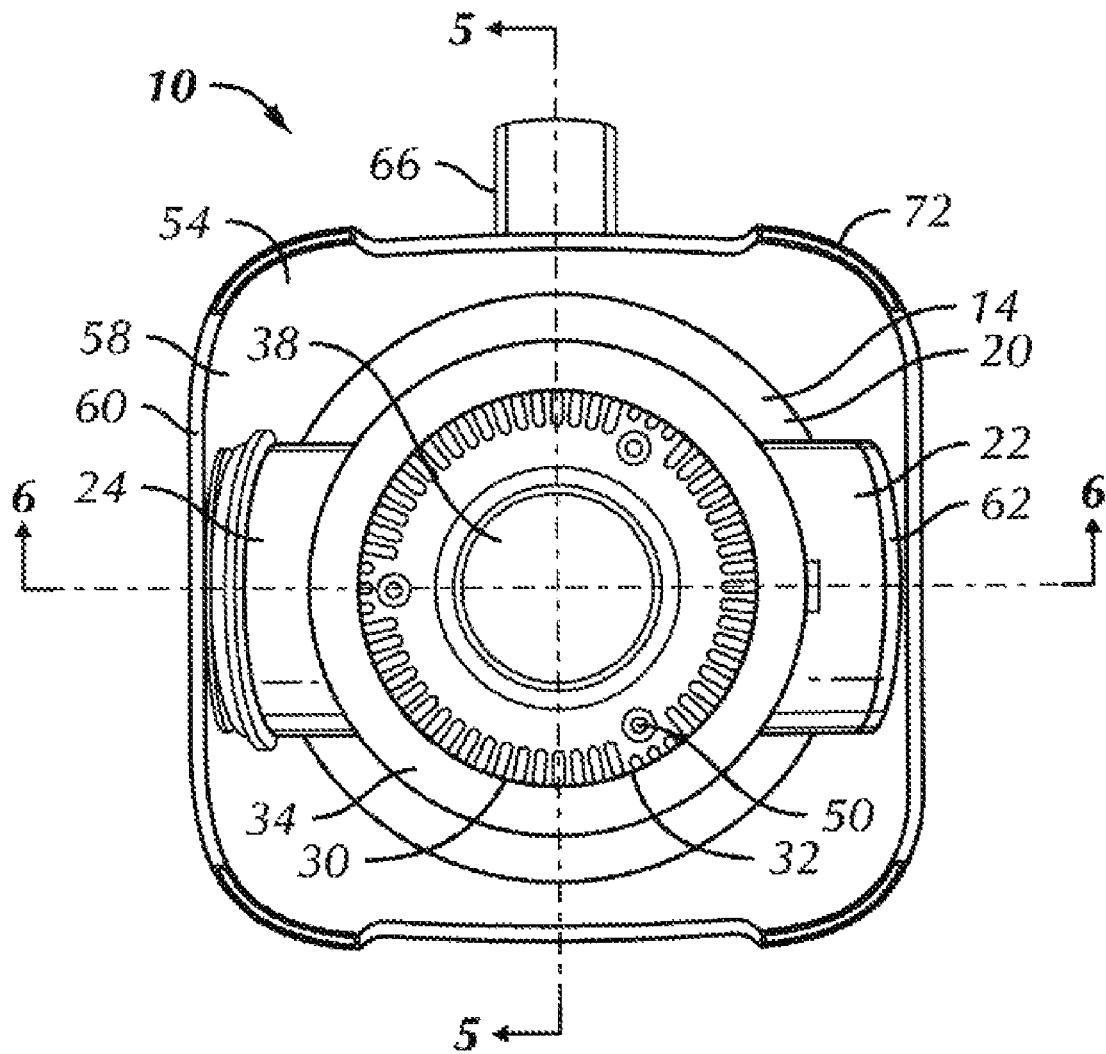
FIG. 4 is a bottom plan view of the blender shown in FIG. 1.
Figure 5:
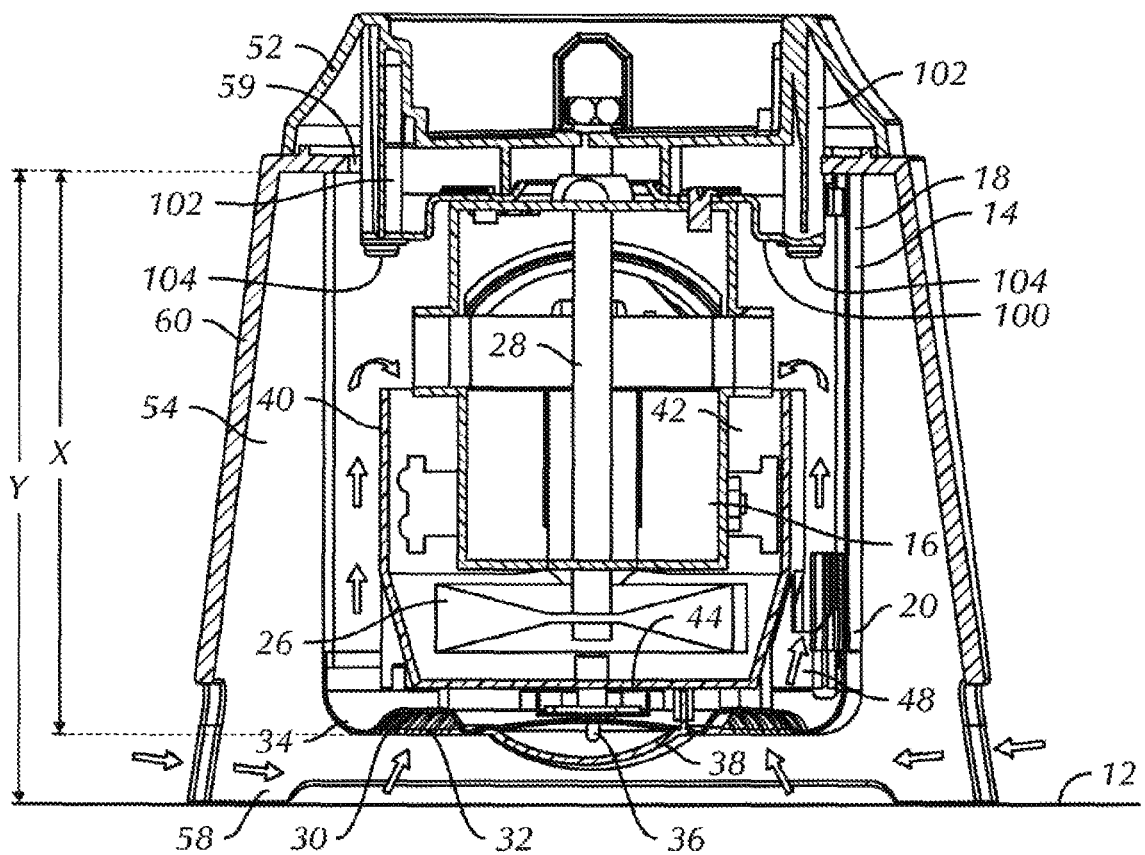
FIG. 5 is a cross sectional view of blender base taken along line 5-5 in FIG. 4.
Figure 7:
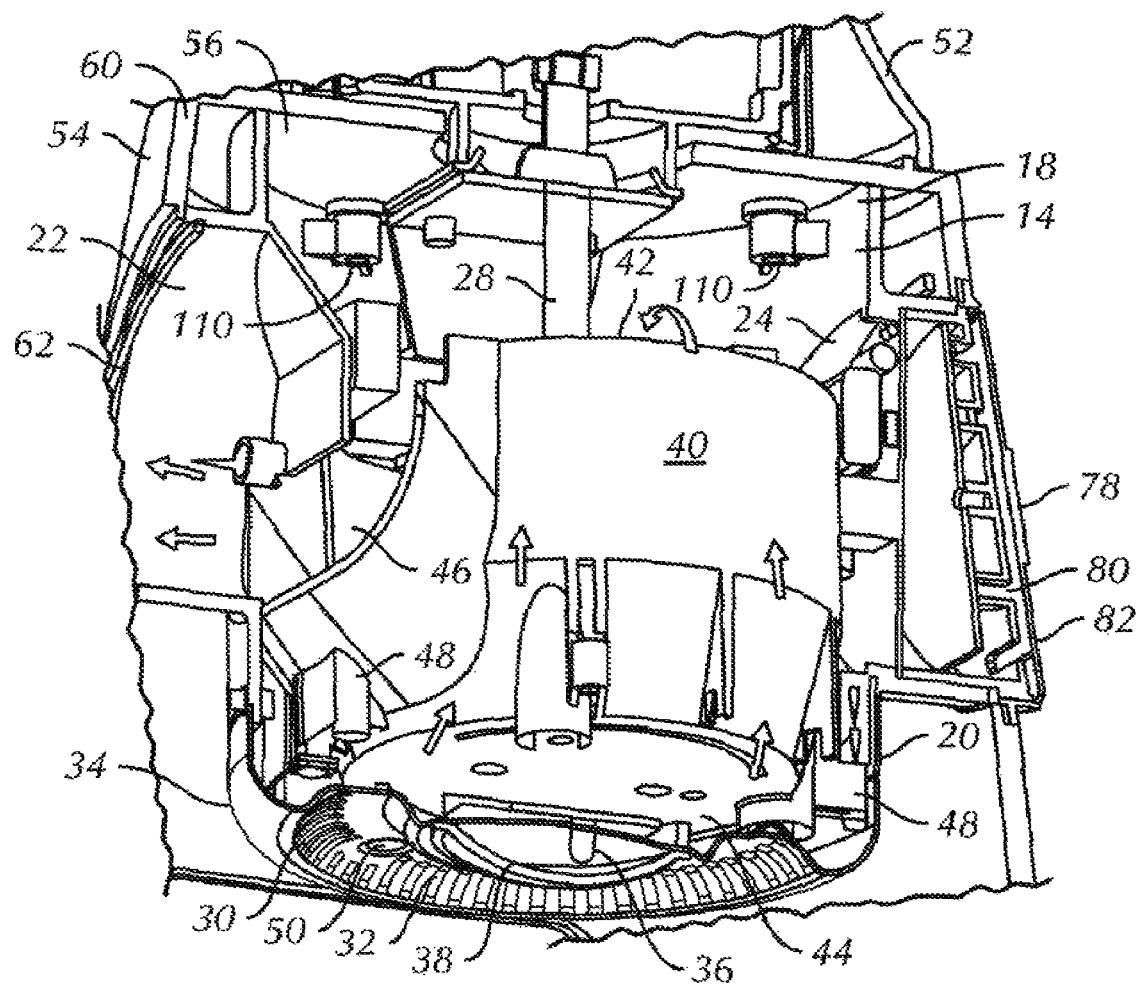
FIG. 7 is a bottom perspective view, partially in cross section of the blender base shown in FIG. 6.

Referring now to FIGS. 4, 5 and 7, the motor housing 14 includes a fan 26 driven by the motor 16. A shaft 28 extends through the motor 16 to directly drive the fan 26. The fan 26 is positioned proximate the second end 20 of the motor housing 14 and preferably drives air over the motor 16 and towards the second end 20 of the motor housing 14. The fan 26 is a standard impeller fan well understood by those of ordinary skill in the art. Accordingly, further description of the fan 26 is omitted for purposes of convenience only and is not limiting. The second end 20 of the motor housing 14 includes intake vent openings 30. The intake vent openings 30 positioned at the second end 20 of the motor housing 14 are a series of radially extending slots 32 positioned at the second end 20 of the motor housing 14 and extend circumferentially around the second end 20 of the motor housing 14. The second end 20 of the motor housing 14 is preferably formed of a separate end cap 34 which is secured to the motor housing 14 in a conventional manner, such as by a snap fit, threads, press fit, or secured by fasteners. The end cap 34 is preferably constructed of the same material as the motor housing 14, but could be constructed of other materials, such as metal, specifically, stainless steel.

Referring to FIGS. 2 and 4-7 the motor housing 14 includes a light 36. The light 36 is preferably positioned on the second end 20 of the motor housing 14. However, the light 36 may be mounted anywhere in the blender 10, such as in the upper housing 52 or the first or second side extensions 22, 24 to illuminate the base 54 and support surface 12, as described in more detail hereinafter. The light 36 is preferably a light emitting diode but may be comprises of any element capable of generating light. Additionally, the light 36 is not limited to a single light 36 but may comprise a series of lights. The light 36 extends through the end cap 34. A lens 38 is positioned over the light 36 on the end cap 34. The lens 38 is comprises of a translucent polycarbonate material or any material capable of concealing the light 36 while allowing the generated light from the light 16 to pass through the lens 38. The lens 38 may be separately attached to the end cap 34 or may be co-molded or made of the same material as the end cap 34. The light 36 may be activated when the blender 10 is in the ON position, when power is supplied to the blender 10, correspond to the torque of the motor 16, or synchronized to any of the blender 10 functions. For example, the light 36 may be constantly ON when the blender is ON or may include a pulsing or blinking effect that increases in frequency as the motor speed increases. Additionally, the light 36 may be activated when the blender 10 is OFF but plugged in or set to a standby mode. The light 36 illuminates the support surface 12, the motor housing 14 and any of the components around the motor housing 14. The light 36 may include a plurality of colors or a single color light. The light 36 may flash after the food is blended to a certain consistency or when the torque of the motor 16 is reduced to a certain level indicating that the food is sufficiently blended.

Figure 6:
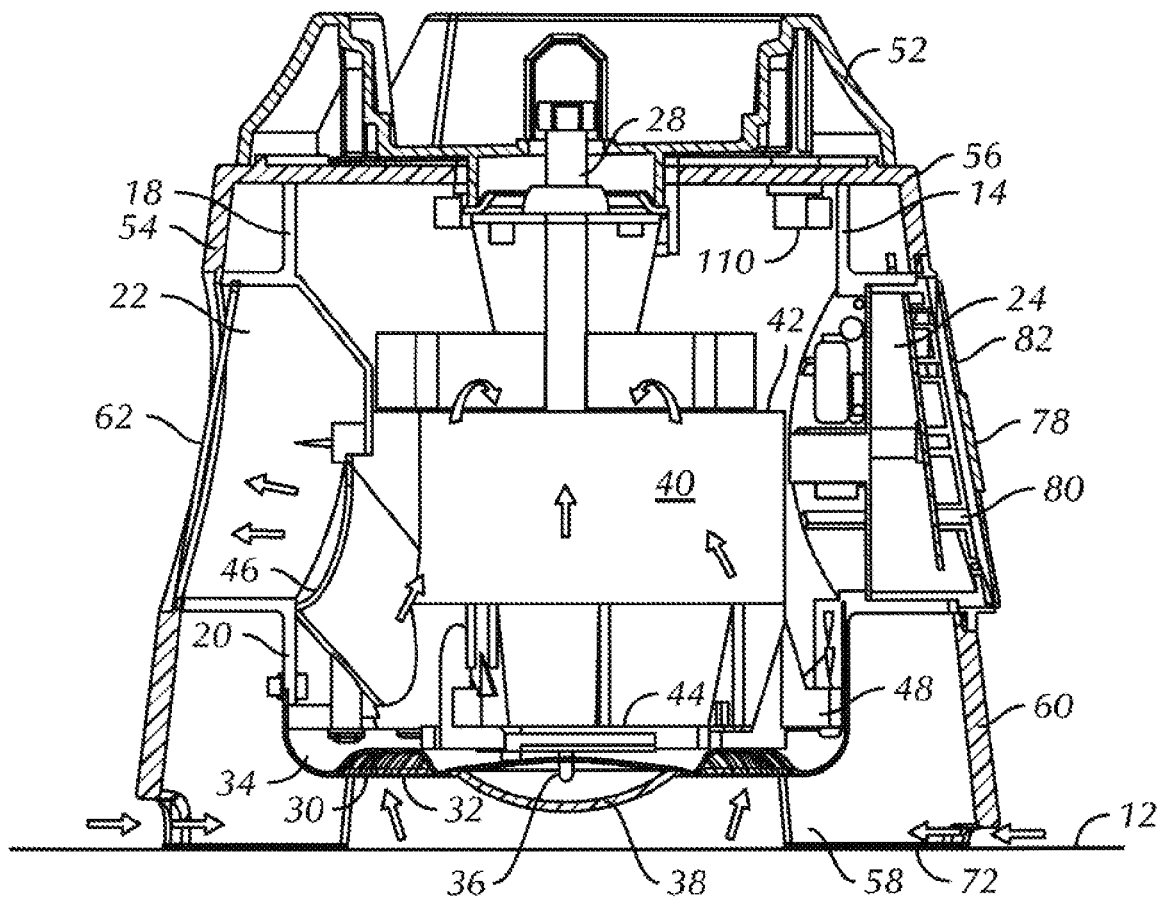
FIG. 6 is a cross sectional view of the blender base taken along line 6-6 in FIG. 4.

Referring to FIGS. 5-7, a shroud 40 is positioned partially around the motor 16 within the motor housing 14. The shroud 40 is positioned between the fan 26 and the second end of the motor housing 20. The shroud 40 has an open top face 42 that is open towards the first end 18 of the motor housing 14. The shroud 40 includes an open side portion 46. The open side portion 46 is aligned with the proximal end of the first side extension 22 of the motor housing 14. The shroud 40 has a closed bottom portion 44 located between the fan 26 and the second end 20 of the motor housing 14. The closed bottom portion 44 has a cup-shaped extension 45 where the open side portion 42 meets the first side extension 22. The shroud 40 is slightly tapered towards its closed bottom portion 44 to direct the air flow around the shroud 40 as described in further detail below. The shroud 40 is secured to the motor housing 14 at its closed bottom portion 44 by a plurality of fasteners (not shown). The fasteners may include screws or press pins. The shroud 40 includes a plurality of arms 48 for receiving the fasteners and being secured to the motor housing 14. The shroud 40 may also be co-molded with the motor housing 14 or the end cap 34. The shroud 40 may also be inverted if the fan 26 is positioned towards the first end 18 of the motor housing 14. The end cap 34 includes a plurality of recessed holes 50 for receiving fasteners and being received into the closed bottom portion 44 of the shroud 40. The shroud 40 is preferably comprised of a polypropylene type material but may be comprises of any rigid material capable of withstanding the heat generated by the motor 16.

The blender 10 includes an upper housing 52 attached to the first end 18 of the motor housing 14. Positioned below the upper housing 52 is a base 54. The base 54 at least partially surrounds and preferably entirely surrounds the motor housing 14. The base 54 has a first end 56 and a second end 58 and a second distance Y between the first and second ends 56 and 58 of the base 54. The second end 58 of the base 54 engages the support surface 12 during use of the blender 10. The second end 58 of the base 54 has varied lengths to allow gaps between the second end 58 of the base 54 and the support surface 12. Alternatively, the second end 58 of the base 54 may have a uniform length and a vent or a series of vents may be included in the base 54 towards its second end 58. The second end 58 of the base 54 is preferably completely open to expose the second end 20 of the motor housing 14. The second end 58 of the base 54 may also be closed with the base 54 instead having an open portion or a vent. The base 54 is shown rectangular with a flared second end 58 but may also be more cylindrical without a flared second end 58.

Referring to FIGS. 5 and 7, the first end 56 of the base 54 is clamped between the upper housing 52 and the first end 18 of the motor housing 14. The first end 56 of the base 54 has a complementary opening 59 to allow the motor housing 14 and the upper housing 52 to be secured together as described in more detail hereinafter. A mounting plate 100 extends from the top of the motor 16. The upper housing 52 includes a plurality of mounting fingers 102 that extend downwardly through the opening 59 into engagement with the plate 100. A corresponding plurality of screws 104 extend through holes in the mounting plate 100 into the mounting fingers 102 to secure the motor 16 to the upper housing 52. The first end 56 of the base 54 is clamped between the upper housing 52 and the motor housing 14 by a plurality of bosses 110. The bosses 110 extend from the first end 18 of the motor housing 14 by a plurality of bosses 110. The bosses 110 extend into and is received by the upper housing 52. That is, when the fasteners are inserted in the bosses 110 and tightened, the motor housing 14 and the upper housing 52 are drawn together and the base 54 is clamped between the motor housing 14 and the upper housing 52. The motor housing 14 is inserted within the base 54 and secured by fasteners within the bosses 110. The shaft 28 of the motor 16 is inserted into the second end 58 of the base 54 and through the upper housing 52 to operatively engage the clutch 106. The motor 16 is secured to the upper housing 52 by tightening the screws 104 on the mounting plate 100 into the mounting fingers 102. The shroud 40 is inserted over the motor 16 and secured to the motor housing 14 by tightening the fasteners. The end cap 34 is then positioned on the second end of the motor housing 20 and secured into place. The blender 10 may also be assembled in the reverse order. The order and method of assembling the blender 10 is for illustrative purposes only and is not limiting.

Figure 3:
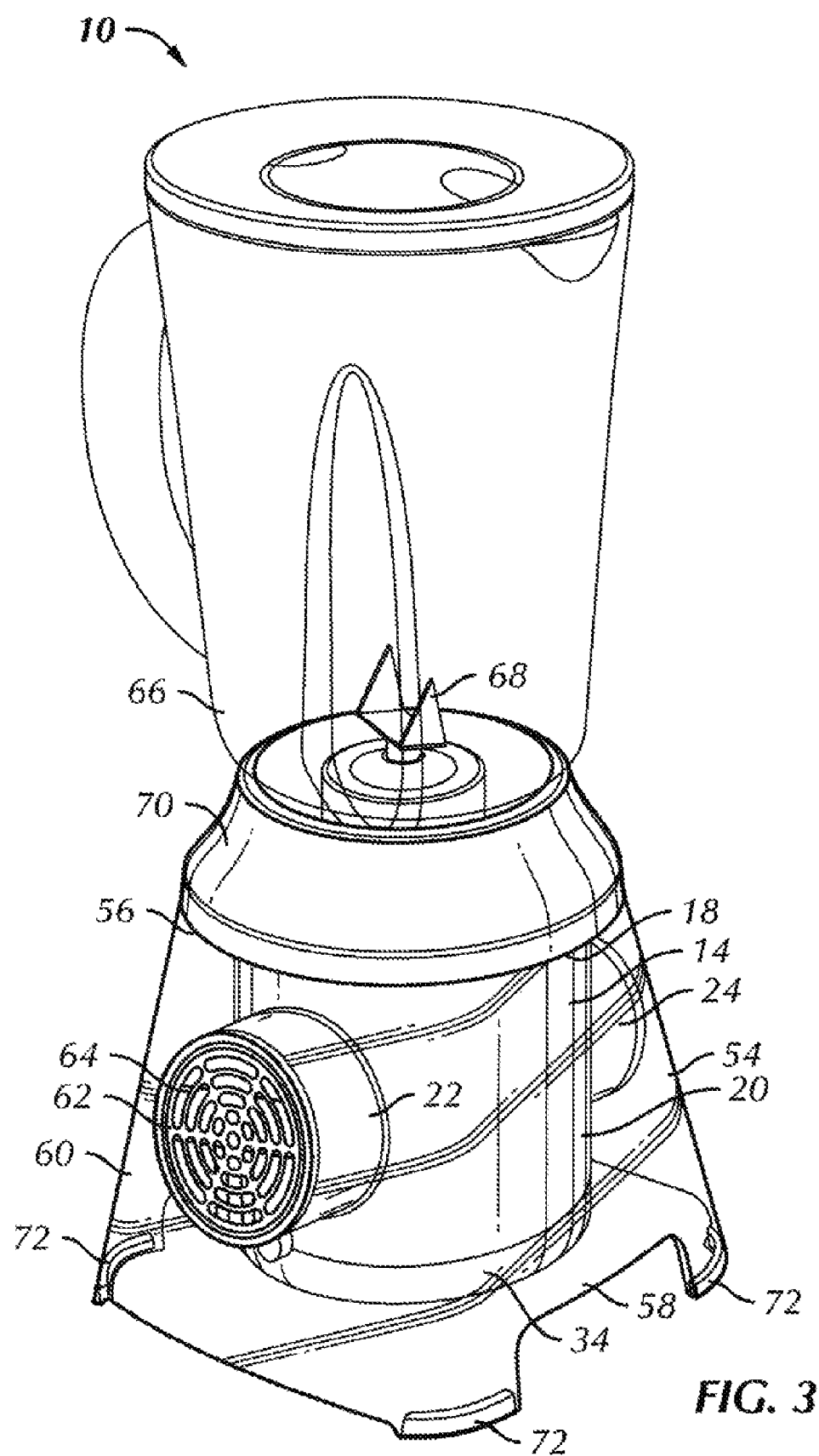
FIG. 3 is a rear perspective view of the blender shown in FIG. 1.

Referring to FIGS. 3, 5, and 6, the first distance X is less than the second distance Y such that the second end 20 of the motor housing 14 is spaced from the support surface 12 during use to thereby solely suspend the motor housing 14 from the first end 56 of the base 54. The distance X, and correspondingly the second end 20 of the motor housing 14, is preferably as close to aligning with the openings in the base 54 as possible so as to reduce the distance ambient air must travel to the intake vent 30. This prevents dust carried by the ambient air to accumulate on the interior surface of the base 54. The air flow is preferably directed away from, and as close to perpendicular to the sidewall 60 at all times. The weight of the motor 16 is substantially supported by the upper housing 52 and base 54. Because the first and second side extension 22, 24 are connected to the base 54, some of the weight of the motor 16 may be supported by the first and second side extensions 22, 24. The second end 20 of the motor housing 14 is preferably entirely free from connection with the base 54. However, a cover (not shown) may be placed on the second end 58 of the base 54 to connect the second end 20 of the motor housing 14 to the second end 58 of the base 54 while exposing the intake vent 30. The cover may be included to prevent airflow from easily reaching the interior of the base 54. The base 54 has a side wall 60 that at least partially and preferably entirely surrounds and is spaced from the motor housing 14. The side wall 60 of the base 54 includes an outtake vent 62 in fluid communication with the open side portion 46 of the shroud 40. The outtake vent 62 includes a plurality of circumferential slots 64 that are radially spaced but the slots 64 may encompass any pattern. The size of the outtake vent 62 is preferably the size of the first side extension 22. The outtake vent 62 covers the first side extension 22 to prevent objects from entering the bas 54 but allows fluid communication between the motor housing 14 and the ambient air around the base 54. The base 54 is comprised of a transparent or translucent material such as an acrylic polymethyl methacrylate, or PMMA, polycarbonate, styrene acrylonitrile (SAN), or similar materials used for crystal clarity. The base 54 is preferably transparent in order to view the motor housing 14 and the illuminated support surface 12 and components within the base 54. The base 54 is preferably formed by a molding process. The vent 62 is preferably constructed of the same material as the motor housing 14 but is not limited to any particular material.

Referring to FIGS. 1-3 and FIG. 5, a jar 66 is releasably positioned on the base 54. The jar 66 is preferably constructed of a transparent, generally rigid material that is able to withstand the normal operating conditions of the jar 66. The preferred jar 66 is constructed of a generally rigid, injection molded polymeric material that is at least partially transparent such that foodstuff within the jar 16 may be viewed by a user. The jar 66 is not limited to a specific embodiment or being constructed of a transparent material or to being constructed of an injection molded polymeric material and may be constructed of nearly any, generally rigid material that is able to take on the general shape of the jar 66 and withstand the normal operating conditions of the jar 66, for example, glass, stainless steel or aluminum. The jar 66 has a rotatable blending tool 68 therein which is driven by the motor 16. The blending tool 68 is driven by the shaft 28 through the clutch 106 and thereby driven by the motor 16 in a manner well understood by those of ordinary skill in the art. The jar 66 includes a collar 70. The collar 70 is rotatably attached to bottom of the jar 66 and is configured to receive and completely cover the upper housing 52. The collar 70 is removable to allow access to and removal of the blending tool 68. When the jar 66 is positioned on the base 54 it completely covers the upper housing 52 and rests on the surface of the upper housing 52 and the first end 56 of the base 54. The collar 70 may also be received within a recess in the upper housing 52 rather than positioned over the upper housing 52 as described above. The collar 70 and upper housing 52 are preferably comprised of the same material as the motor housing 14 and the outtake vent 62 but are not limited to any specific material. Additionally, the collar 70 and the upper housing 52 are preferably opaque but the collar 70 or the upper housing 52 may be constructed of a transparent or translucent material.

Referring to FIGS. 4-7, when the blender 10 is in operation, the fan 26 draws ambient air through the second end 58 of the base 54 into the motor housing 14 through the intake vent openings 30 and then up and around the outside of the shroud 40 into the open top portion of the shroud 40 and over the motor 16 and through the fan 26 to thereby cool the motor 16. The shroud 40 directs the air to be passed over the motor 16 with little recirculation or turbulent vortices or eddies being formed within the motor housing 14. Once the air passes over the motor 16 acting as a heat exchange to keep the motor at a safe operating temperature, the warmed air is then directed against the closed bottom portion 44 of the shroud 40 and then directed through the open side portion 46 of the shroud 40, through the first extension 22 and out through the outtake vent 62 to atmosphere. The airflow is sealed form the base 54 such that once the air is draw into the second end 20 of the motor housing 14, the air is kept from passing over the interior surface of the base 54. This results in keeping the interior of the base 54 generally dust free.

Referring to FIGS. 1-4 and 9, the base 54 includes a plurality of base feet 72. The base feet 72 are constructed of a translucent elastameric material and are in the form of an elongated rectangular strip having a thickness T which is less than a thickness U of the sidewall 60 of the base 54. The base feet 72 include a first end 74 and a second end 76. The first end 74 of the base feet 72 is at least partially positioned within the opening 108 in the bottom edge of the base 54. The second end 76 of the base feet 72 extends outwardly from the bottom edge of the base 54 for engagement with the support surface 12. The base feet 72 help grip the support surface 12 to prevent unwanted sliding with respect to the support surface 12. The base feet 72 also act as a shock absorber to prevent cracks and scratches in both the support surface 12 and the blender base 54. The base feet 72 are preferably curved to fit along the corners of the bottom edge of the base 54 but may be positioned anywhere along the bottom edge of the base 54 or even extend entirely around the bottom edge of the base 54. The base feet 72 may also have curved edges or be cylindrically shaped. The base feet 72 may be separately inserted into the base 54 or may be co-molded into the bottom edge of the base 54. The base feet 72 are preferably secured to the base 54 with an epoxy, but other fastening methods are acceptable, such as a friction or snap fit. The base 54 preferably includes four base feet 72 but any number of feet could be used without departing from the spirit and scope of the invention.

Figure 8:
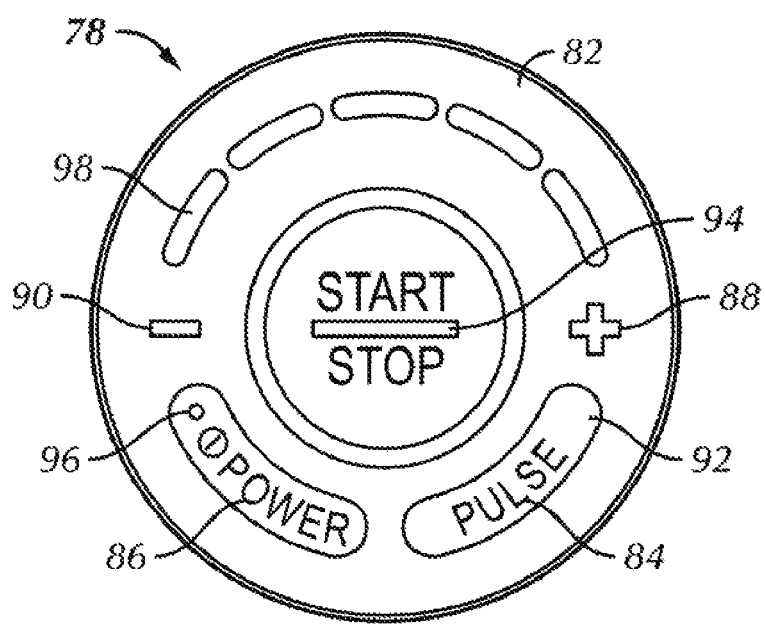
FIG. 8 is a front elevational view of a control switch of the blender shown in FIG. 1.
Figure 9:
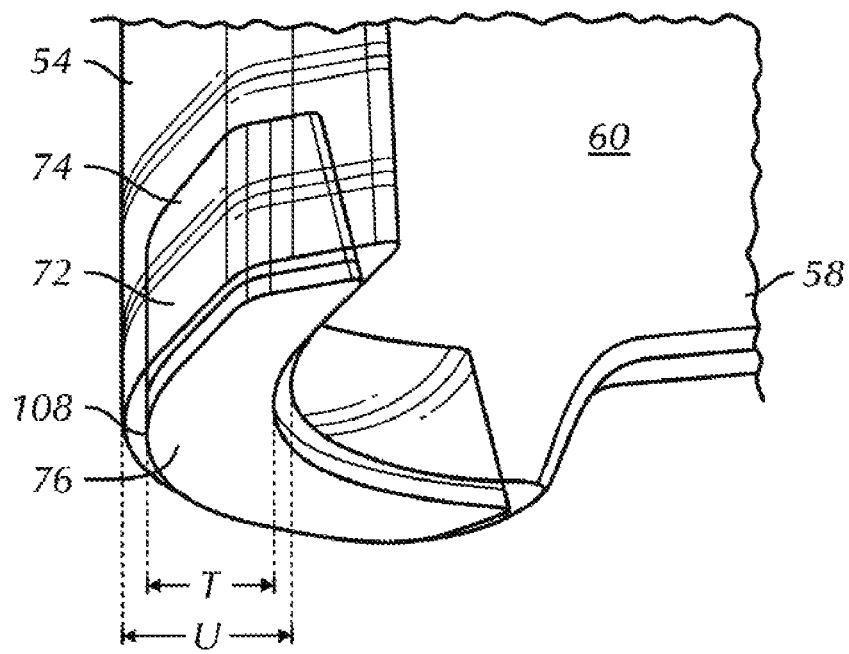
FIG. 9 is an enlarged bottom perspective view of a base foot of the blender shown in FIG. 1.

Referring to FIGS. 1, 7 and 8, the blender 10 includes a control switch 78 for controlling the electric motor 16. The control switch 78 is positioned within the sidewall 60 the base 54 and is aligned with the second side extension 24 of the motor housing 14. The control switch 78 includes a plurality of switches 80 disposed beneath a flexible cover 82. The flexible cover 82 includes indicia 84 printed thereon corresponding to the respective switch 80. The switches 80 may include a power switch 86, a speed increase switch 88, a speed decrease switch 90, a pulse switch 92, and an activation or start/stop switch 94. An indicator light 96 indicating when the blender 10 is powered on is positioned next to the power switch 86. The printed indicia 84 corresponds to the appropriate switches 86, 88, 90 and 92 for controlling the electric motor 16 to operate the blender 10. The flexible cover 82 includes light emitting diodes or an electroluminescent display to light up various indicia 84 on the flexible cover 82 including a plurality of bars 98 stretching from the speed decrease switch 90 to the speed increase switch 88. The switches 80 may include a variety of switch types to allow smooth finger-tip control of the blender 10. A mechanical switch may be positioned behind each of the indicia 84 on the flexible cover 82 and concealed within the second side extension 24 of the motor housing 14. Alternatively, a rotary dial may be positioned between the speed increase switch 88 and the speed decrease switch 90 to allow a rotary action on the flexible cover 82 to increase and decrease the speed of the blender 10. A membrane switch may replace one or more of the mechanical switches. The membrane switch is a conventional membrane switch that includes 2-4 layers of polyethylene terephthalate (PET). The first layer includes a circuit printed. The second layer acting as a spacer, can be paper or PET. Third layer acts as a circuit closer. The control switch 78 may include a resistive change switch in place of one or more of the above switches 80. The resistive change switch, also referred to as a force sensitive resistor, is preferably 0.3 mm thick and is preferably comprised of a plurality of voltage dividers, but is not so limited. Resistive change switches are often used in the touchpads of cellular telephones. The control switch 78 may also include a capacitive switch in place of one or more mechanical switches. The capacitive switch is exposed through the flexible cover 82. Capacitive switches work using body capacitance and charging and discharging a metal surface to detect changes in capacitance. When a user touches the surface, it increases the capacitance, and the switch 80 activates or turns off. Further detail of the switches 80 and the various types discussed above is known to those skilled in the art. Accordingly, further description of the various switches 80 is omitted for purposes of convenience only and is not limiting.

It will be appreciated by those skilled in the art that changes could be made to the embodiments described above without departing from the broad inventive concept thereof. It is understood, therefore, that this invention is not limited to the particular embodiment disclosed, but it is intended to cover modifications within the spirit and scope of the present invention as defined by the appended claims.

We claim:

1. A blender for blending foodstuff, the blender for being positioned on a support surface, said blender comprising:

a motor housing enclosing an electric motor and having a first end, a second end and a first distance between the first and second ends, the second end of the motor housing having an intake vent opening, the motor housing enclosing a fan driven by the motor, the fan being located between the motor and the intake vent opening;

an upper housing attached to the first end of the motor housing;

a base partially surrounding the motor housing and having a first end, a second end and a second distance between the first and second ends of the base, the second end of the base engaging the support surface during use, the first end of the base being clamped between the upper housing and the first end of the motor housing such that at least a portion of the upper housing extends through an opening in the first end of the base and that at least a portion of the upper housing is fixedly secured to a portion of the motor housing, the first distance being less than the second distance such that the second end of the motor housing is spaced from the support surface during use to thereby solely suspend the motor housing from the first end of the base further comprising:

a mounting plate extending from a top of the motor proximate the first end of the motor housing;

a plurality of mounting fingers extending downwardly from the upper housing through the opening in the first end of the base into engagement with the mounting plate; and a corresponding plurality of screws downwardly extending through holes in the mounting plate into the mounting fingers to secure the motor to the upper housing.

2. The blender of claim 1, wherein the second end of the base is open to expose the second end of the motor housing.

3. The blender of claim 1, wherein the base is comprised of a transparent material.

4. The blender of claim 1, wherein the base is comprised of a translucent material.

5. The blender of claim 1, wherein one of the base and the motor housing includes a light mounted thereto.

6. The blender of claim 1, wherein a light is disposed within the upper housing.

7. A blender for blending foodstuff, the blender for being positioned on a support surface, said blender comprising:

a motor housing enclosing an electric motor and having a first end and an opposing second end, a light extending through at least a portion of the second end of the motor housing to illuminate the support surface, a lens being positioned over the light to enclose the light between the second end of the motor housing and the lens, the lens being translucent to conceal the light while allowing light rays from the light to pass through the lens;

an upper housing attached to the first end of the motor housing;

a base having a first end and an opposing second end, the base at least partially surrounding the motor housing and being constructed of a transparent material to view the illuminated support surface beneath the base, the second end of the base engaging the support surface during use, the first end of the base being clamped between the upper housing and the first end of the motor housing such that at least a portion of the upper housing extends through an opening in the first end of the base and that at least a portion of the upper housing is fixedly secured to a portion of the motor housing; and a jar releasably positioned on the base and having a rotatable blending tool therein operatively engaged with the electric motor for being driven by the electric motor when the jar is positioned on the base further comprising:

a mounting plate extending from a top of the motor proximate the first end of the motor housing;

a plurality of mounting fingers extending downwardly from the upper housing through the opening in the first end of the base into engagement with the mounting plate; and a corresponding plurality of screws downwardly extending through holes in the mounting plate into the mounting fingers to secure the motor to the upper housing.

8. The blender of claim 7, wherein the base completely surrounds the motor housing.

9. The blender of claim 7 wherein the base is formed by a molding process such that it is substantially transparent.

10. A blender for blending foodstuff comprising:

a motor housing enclosing an electric motor and having a first end and a second end, the motor housing including a fan driven by the motor, the fan being positioned proximate the second end, the second end of the motor housing including intake vent openings;

a shroud positioned partially around the motor within the motor housing and positioned between the fan and the second end of the motor housing, the shroud having a side wall, an open top facing towards the first end of the motor housing, a completely closed bottom extending laterally from opposing portions of the side wall and located between the fan and the second end of the motor housing, and an open side portion;

a base having a side wall defining an exterior of the blender, the side wall of the base partially surrounding and laterally spaced from the motor housing and having an open bottom, the side wall of the base having an outtake vent in fluid communication with the open side portion of the shroud; and a jar releasably positioned on the base and having a rotatable blending tool therein operatively engaged with the electric motor for being driven by the electric motor when the jar is positioned on the base wherein the fan draws air through the open bottom of the base into the motor housing through the intake vent openings and then around an outside of the shroud into the open top of the shroud to thereby cool the motor and then against the closed bottom of the shroud and then out through the open side portion of the shroud and then through the outtake vent to atmosphere.

11. The blender of claim 1, further comprising:
a shroud positioned at least partially around the electric motor within the motor housing, the shroud having an open top and a closed bottom.

12. The blender of claim 7, further comprising:
a shroud positioned at least partially around the electric motor within the motor housing, the shroud having an open top and a closed bottom.

13. The blender of claim 10, further comprising:
first and second side extensions extending perpendicularly from opposing sides of the motor housing, the first side extension providing an open fluid passageway from the motor housing to a distal end of the first side extension; and a control switch for controlling the electric motor being positioned within the exterior side wall of the base and vertically aligned with the second side extension of the motor housing.

* * * * *